Oct. 29, 1968    G. W. TUMM ET AL    3,408,432
APPARATUS AND METHOD FOR COATING, MOLDING
AND HARDENING WORK PIECES
Filed Aug. 20, 1965      3 Sheets-Sheet 3
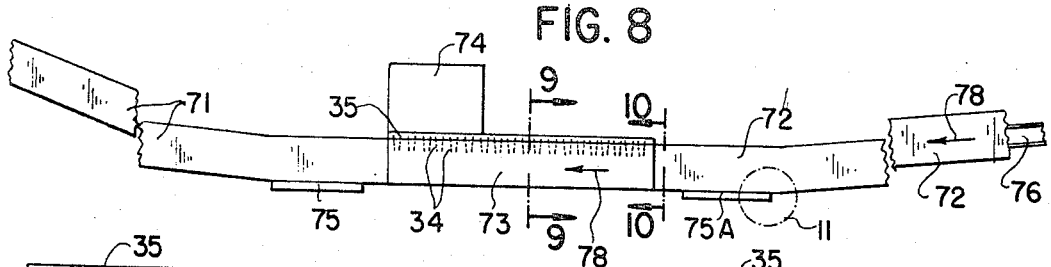
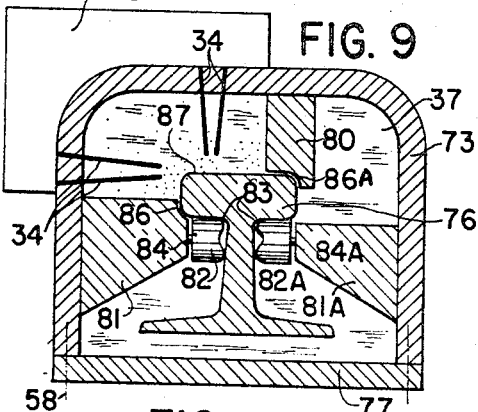
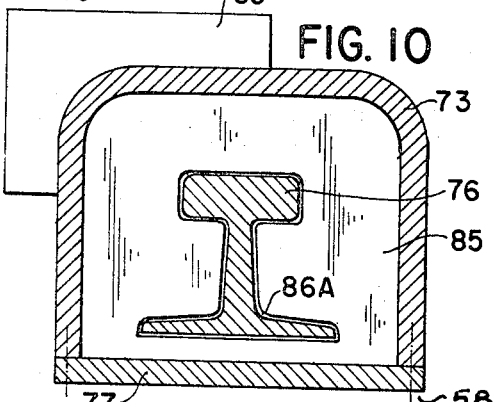
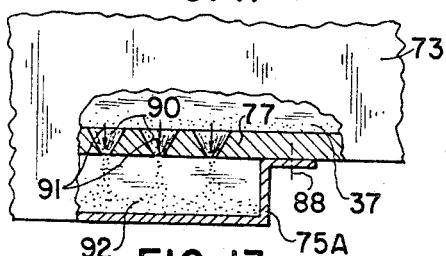
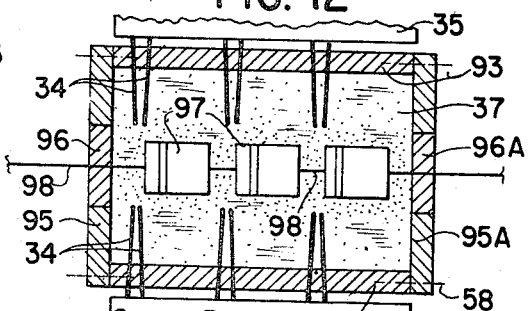
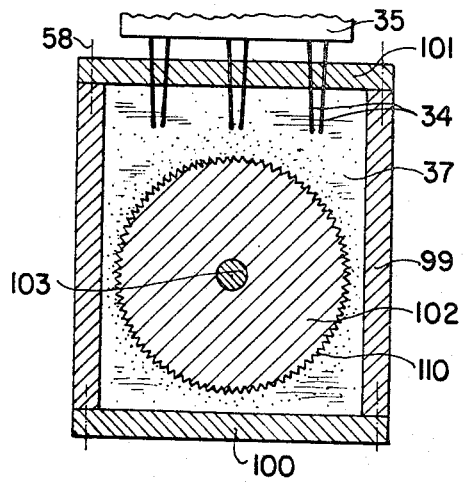
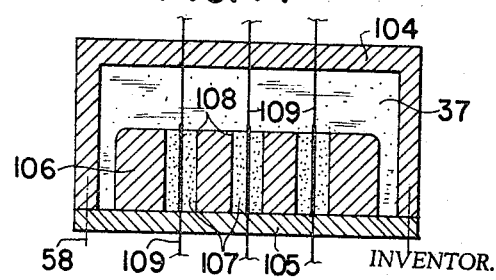
INVENTOR.
Guenter W. Tumm
Joel B. Guin United States Patent Office 3,408,432
Patented Oct. 29, 1968

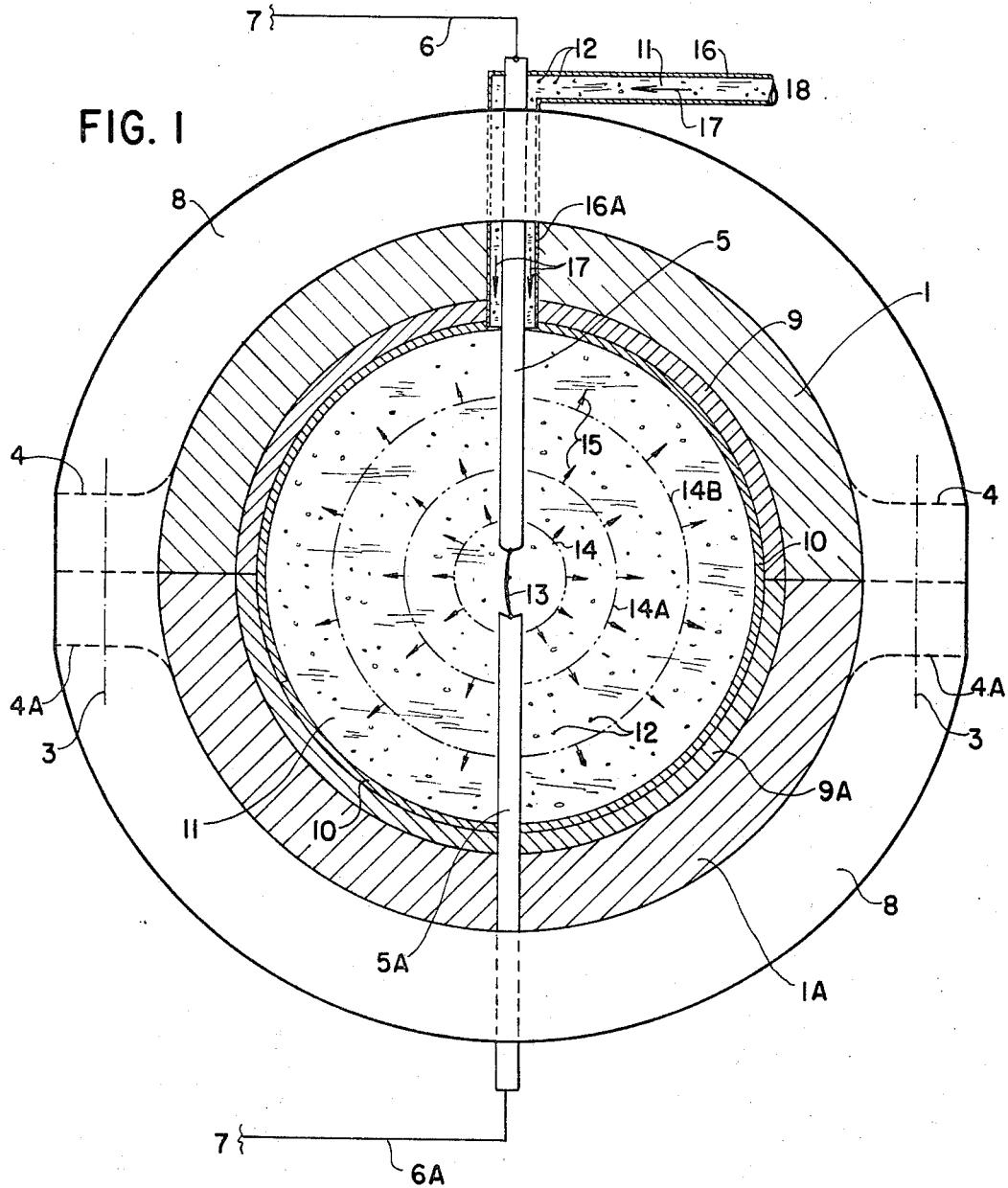

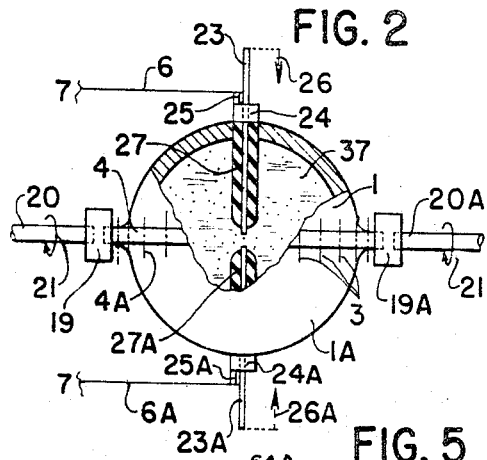
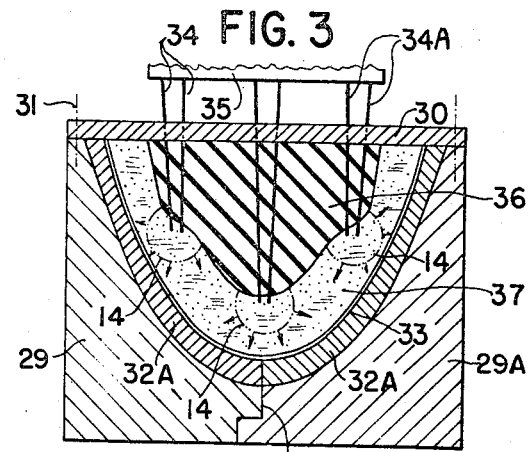
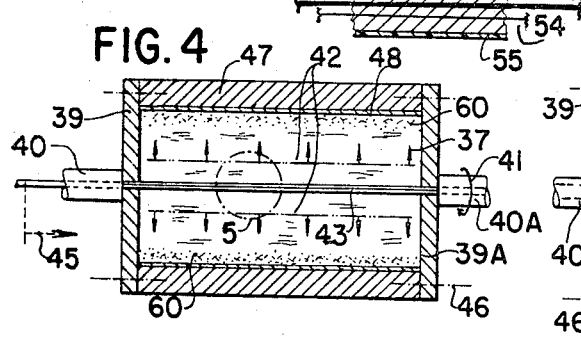
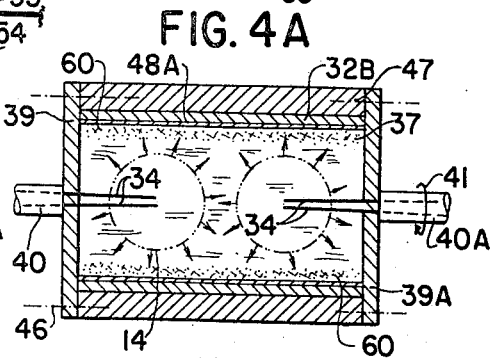
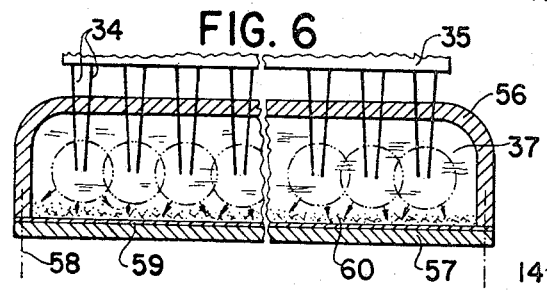
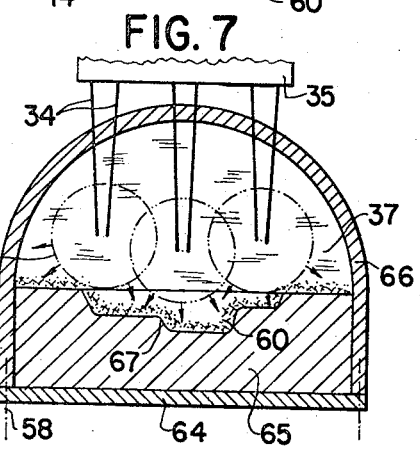
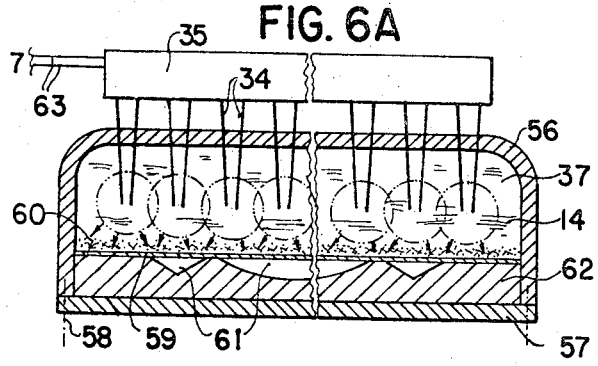

3,408,432
APPARATUS AND METHOD FOR COATING,
MOLDING AND HARDENING WORK PIECES
Guenter W. Tumm, Mansfelder Str. 27, 1, Berlin 31, Germany, and Joel B. Guin, 148 E. 48th St., New York, N.Y. 10017
Filed Aug. 20, 1965, Ser. No. 481,347
9 Claims. (Cl. 264—84)

ABSTRACT OF THE DISCLOSURE

This disclosure relates to an improvement in apparatus and method with which matter or work pieces can be molded, molded and coated, or molded, coated and hardened by passing one or more electrical charges across the spark gap between two electrodes or a battery of electrodes immersed in a liquid to produce one or more shock waves that impact some of the sinter particles dispersed in said liquid into a thin sintered layer that is impacted or bonded into the exposed surface of a sheet of material or a work piece, or cast them into a cohesive sintered body conforming to a mold. Alternatively, a sheet of material or a roughly formed body placed over a mold will be forced into the mold as it is being coated with a sintered layer of hard material of selective thickness and compactness. Thirdly, the work piece or sheet can be molded, coated and hardened at the same time, the degree of hardness and the thickness of the sintered layer coating depending on the number and strength of the spark discharges, the number and quality of the sintered particles, the amount, temperature and constituency of the liquid, the size and shape of the container, the shape and location of the molds, etc. The preferred embodiment of our invention is provided with rotation means for turning the container holding the molds, liquid, electrodes, etc. in order to distribute more evenly the sinter particles and to cause most of them to form a sludge near the surface of the mold or work piece, to facilitate and expedite the sintering process.

---

This invention relates to an apparatus and method for coating, molding and hardening work pieces for producing sintered bodies with or without a center cavity and more particularly for compacting particles of one or more hard-to-work-with materials into cohesive bodies by successive shock waves induced in a fluid carrying particulate matter. Present methods cannot do this so economically and efficiently as the shock process, and have a much higher percent of spoiled products. The shock process involves use of a sturdy mold of metal, concrete or other strong material, in the shape of a cube, sphere, cylinder, parabola or other suitable shape, covered with ceramic or other material that prevents the sintered product or layer from adhering to the mold. The other space within the mold is filled with water, oil or other liquid appropriate for holding dispersed particles of tungsten, tantalum carbide, Carborundum or other very hard materials in suspension so the shock energy can be brought to bear on it to drive it into molecules of the same or other materials. The container for the mold may be fitted with rotating equipment for quickly turning it upside down to distribute the particles evenly just before each shock. If cylindrical or spherical, the container may be rotated rapidly to concentrate sinter particles in a sludge near the walls, to expedite the process. Repeated shock waves are induced in the fluid either by a spark discharge across the electrodes of a spark-gap, or by explosive charges within the fluid, until the desired thickness is obtained. The container walls and fluid may be heated to facilitate production of some sintered bodies.

In some applications the container can be quickly opened and/or closed in order to remove an article or batch of articles and to prepare for the next operation; in other applications continuous series of shocks can be carried on by conveying the material in through one side and out through the other, with little or no interruption; long articles such as beams, rods, rails, etc. and applications where large quantities of items are to be sintered justify building special automatic sintering equipment. Where only one or a few articles are to be processed or produced, it may be necessary to empty the container, removing product, mold and liquid, before a new mold with fresh liquid and sintered particles can be installed in preparation for the next operation. In the continuous sintering processes, provision is made for simultaneous and automatic adding of sintered particles as needed; where one or only a few articles are to be produced at a time, fresh sintered particles are put in along with the liquid at the start, and carefully measured amounts are added after one or more shocks.

If an explosive is to be used to produce the shock it is of course installed at the start, but elaborate equipment can be provided which pulls a continuous explosive "tube" through specially designed cover means on either side so that a series of explosions can be produced along the inside of a long rounded or cylindrical object.

The renewal and/or addition of fluid and of sintered particles ordinarily depends on the product to be produced and the type of equipment used as well as the kind of explosion, etc.

These objects and advantages will be clear and others will become apparent when the enclosed description is carefully read in conjunction with the accompanying drawings in which FIG. 1 is a vertical section through a spherical shock sintering apparatus in which shock waves are produced by spark discharges;

FIG. 2 is a side view of a spherical apparatus rotatable around an axis to distribute sinter particles throughout the shpere;

FIG. 3 is a vertical section through an apparatus for producing bodies of parabolic shape, such as rocket nose cones;

FIG. 4 is a vertical section along the axis of a device for coating the inside of a cylindrical body with a sintered layer, using a shock from an elongated explosive "tube" at or near the axis, the resulting explosion forcing particles around the inner walls of the body;

FIG. 4A is a modification of the cylindrical shock apparatus in which shock waves are produced by a spark discharge between electrodes;

FIG. 5 is an enlargement of section 5 in FIG. 4 showing details of one part of the elongated explosive "tube";

FIG. 6 is a vertical section through an apparatus for coating with a sintered layer a broad sheet of metal such as the wing or fuselage of a hypersonic aircraft or an aerospace rocket;

FIG. 6A is a modification of the apparatus shown in FIG. 6 in which shocks produce a sintered layer and also press a sheet of metal into a mold;

FIG. 7 is a vertical section through an apparatus for coating a mold with a sintered layer;

FIG. 8 is a side view of an application of the invention for coating steel or other metal rails or beams with a hard layer;

FIG. 9 is an enlarged vertical section along line 9—9 in FIG. 8 showing the arrangement of rollers and spark electrodes;

FIG. 10 is an enlarged vertical section along line 10—10 in FIG. 8 showing a screening wall between the sintering section and the entrance section of the rail-sintering apparatus;

FIG. 11 is an enlargement of section 11 in FIG. 8 showing a section of the chamber for collecting sinter particles;

FIG. 12 is an application of the invention for semi-continuous production of a sintered layer on the outer surface of bodies such as pistons of internal combustion engines;

FIG. 13 is an application of the invention for coating with a hard sintered layer the cutting teeth of a rotary saw, or the cutting edges of tools, knives, drills, etc.; and FIG. 14 is an application of the invention in which the inner walls of bodies such as the cylinders in an engine-block are coated with an even, hard sintered layer.

Above are a few of the possible applications of this invention. In general, it may be stated that any surface likely to undergo severe erosion from any source or high temperatures, or both, will keep its structural integrity better if subjected to one of the sintering processes described herein. Such matters as: size, shape and strength of containers; size, strength, location and attaching means for molds; size, shape and length of explosive charges; wiring, electrodes, adjustment and reversal of electrodes, and current; single, batch, semi-continuous or continuous sintering, will all depend upon the product or products desired and resources available.

Turning to the drawings, the preferred embodiment of the invention is shown in FIG. 1, a vertical section through a spherical shock sintering device in which a shock wave is caused by passing current across the electrodes of a spark-gap disposed within a particle-carrying fluid. The mold and container can be shaped differently, and the shock wave can be produced differently. The shock-sintering casting form consists of upper semi-sphere 1 with flange 4 and lower semi-sphere 1A with flange 4A. Semi-spheres 1 and 1A are held together by attaching means 3 and covered by semi-spheres 9 and 9A of non-adhesive material to prevent the sintered body from sticking to the casting form. When sintering is finished and the upper and lower semi-spheres are removed this ceramic layer can be broken from the sintered body. Around the upper and lower semi-spheres is heating device 8, heated by electricity or by fossil fuel. An upper electrode 5 is introduced from the top and a lower electrode 5A from the bottom into the middle of the sphere, leaving a spark-gap across which current flows to produce spark discharge 13 when the distance between the electrode tips is properly adjusted for the current flowing through circuits 6 and 6A above and below respectively, from power source 7, not shown. The interior cavity of the sphere is filled with a fluid 11 such as water carrying dispersed sinter particles 12, both being pumped from storage and pumping unit 18, not shown, via channels 16 and 16A (arrows 17).

The moment spark 13 is produced powerful shock waves drive outward, their successive time intervals being indicated by dotted circles 14, 14A and 14B, all the way to the inner walls of non-adhesive layers 9 and 9A, producing sintered layer 10, the density of which depends on parameters such as shock strength, number of dispersed particles per cc., particle material used, interior cavity radius, temperature, etc. and whose thickness is a function of the number of shocks produced.

A modification in which the container may be rotated to reverse the electrode poles and to distribute the sinter particles more evenly is shown in FIG. 2, an elevation with a cut-away of a spherically shaped apparatus. Upper and lower semi-spheres 1 and 1A are joined by attaching means 3 through upper and lower flanges 4 and 4A, and carry sinter particles dispersed in liquid 37. The flanges are connected with bearing units 19 and 19A into which shafts 20 and 20A respectivel yare inserted so as to rotate freely. After each shock the shafts rotate as shown by arrows 21, thus re-distributing sinter particles which tend to sink of their own weight. Piercing semi-spheres 1 and 1A are electrodes 23 and 23A respectively, surrounded by electrode structures 27 and 27A respectively, to protect the electrodes from the shock waves. These electrodes will normally wear out unevenly at their tips due to spark erosion, but may be adjusted by fastening units 24 and 24A which extend them toward the middle of the sphere in the direction of arrows 26 and 26A respectively. Electrcial energy reaches the electrodes through circuits 6 and 6A and contacts 25 and 25A respectively, from power source 7, not shown. In this application, since the contacts stay in position, rotation of the sphere will reverse the poles of the electrodes, thus countering the unequal erosion and lengthening the life of the electrodes.

FIG. 3 is a vertical section through a device consisting of left and right mold sections 29 and 29A and upper plate 30 attached by attaching means 31 to the mold the inner surface of which is covered with cladding 32A of material such as ceramic to reduce adhesion of the sintered layer. Attached to upper plate 30 is an electrode structure 36 of non-conducting material to protect electrodes 34 and 34A which are attached to and extended downward from structure 35 through plate 30. Spark discharges across electrodes 34 and 34A respectively produce repeated shock waves to compact the particles into sintered layer 33. In this case a parabolic body results, but any body having a center cavity can be similarly produced.

FIG. 4 is a vertical section through an apparatus for producing a sintered layer on the inner wall of a cylindrical body. Cylindrical mold 47 has left and right end plates 39 and 39A respectively fastened to its ends by screws 60. Left and right shafts 40 and 40A are fixedly attached to shafts 39 and 39A respectively, the entire device thus rotating as the shafts are turned, direction of rotation being shown by arrow 41. This rotation produces centrifugal forces which drive some sinter particles toward the cylinder walls, thus concentrating them into a sludge layer 60 and multiplying the number of particles deposited by each shock. The optimum speed of rotation depends on the characteristics desired in the body produced, on the particles used, on the liquid, temperature, current, etc. In this modification the shocks are produced by igniting an elongated explosive "tube" 43 which enters mold 47 through a hole in shaft 40 and exits through a hole in shaft 40A on the right, in the direction of arrow 45. The explosion produces axially symmetric shock wave (dotted lines 42) that travel to the cylinder walls where they compact some of the sinter particles, pounding them in among the particles already deposited in coating 48 on the inner cylinder 47, resulting in a rigid, cohesive body of selective thickness after multiple shock waves.

FIG. 4A is a modification in which shock waves are produced by spark discharges across the gap between electrodes 34. A sintered cylindrical body 48A is produced along the inner surface of cladding 32B which in turn fits snugly within cylindrical mold 47. With few or no changes a previously formed body fitting inside either mold 47 of FIG. 4 or mold 47A of FIG. 4A can be coated with a sintered layer of any desired thickness and hardness. (In this case bodies 48 and 48A could have been such a previously formed body.)

FIG. 5 is an enlargement of section 5 in FIG. 4 showing gunpowder, TNT or other explosive material 53 within cylindrical plastic container 55. Running through the material within the container is electric wire-fuse 54, and support wire 54A, the latter being used to draw out the used portion of said wire-fuse and draw in a fresh length to replace it prior to the next shock.

FIG. 6 is a vertical section through a horizontal shock sintering device consisting of bottom plate 57 and mold-vessel 56 attached thereto by attaching means 58. Covering the bottom of the container lies metal sheet 59, above which is a sludge of sinter particles 60. The spark discharges between electrodes 34 produce shock waves that coat the metal with a sintered layer.

FIG. 6A is a modification in which an additional mold 62 having indentations 61, of selective shape, is disposed above bottom plate 57. The shock waves produced by spark discharges between electrodes 34 coat the metal sheet with a sintered layer and simultaneously press the sheet into the molding form. Electrodes 34 connected to structure 35 receive current through lines 63. The devices shown in FIGS. 6 and 6A are particularly suitable for hardening and toughening large surfaces that are to undergo very high temperatures and pressures per unit area, such as the wing and fuselage surfaces of hypersonic aircraft, future aerospace rockets, MOL's, OSO's, etc. To properly sinter such bodies, enormous pressures requiring heavy container reinforcement will be needed to crystallize the metal surface to near-diamond hardness.

FIG. 7 is a vertical section through a shock sintering device consisting of bottom plate 64 on which is mounted and attached by conventional attaching means 58 such as screws and mold vessel 66. Within the vessel is a mold 65 having a cavity 67 of selective shape, and covered with a sludge of particulate matter to be compacted by shock waves 14. This is particularly suitable for coating gears, bearings, engine parts, etc.

FIG. 8 is a side view of a rail-sintering machine consisting of entrance channel 72 into which rail 76 is brought in the direction of arrow 78, a sintering section 73 having electrodes 34, electrode connector 35, power generator 74, and exit section 71. All sections are filled with liquid but sinter particles are introduced only into sinter chamber 73. Fastened to the lower sides of the entrance and exit sections are sinter particle collecting chambers 75 and 75A. The rail enters from the right, the part usually eroded most is coated with a sintered layer, and the rail exits on the left. A machine of similar shape can be used to pre-stress or pre-strain a steel beam, rod, or rail requiring unusual strength, hardness and rigidity. The rail, beam or rod can be bent in the middle or in several different places and held during the sintering process: building in a tendency to return to the same position. Then the beam, rail or rod can be bent in another direction or shape, and sintered on that side, building in a tendency to return to the same position. The two opposing strains counteract each other and confer unusual rigidity, pre-torquing and other qualities useful in generator shafts, aerospace components, etc.

FIG. 9, an enlarged vertical section along line 9—9 in FIG. 8, shows mold vessel 73 mounted on bottom plate 77 and attached thereto by conventional means 58 such as screws. Rail 76 glides on left and right rollers 82 and 82A respectively, which have scalloped periphery edges 83 which restrict the sidewise motion of the rail. The rollers are rotatably mounted on shafts 84 and 84A extending from supports 81 and 81A respectively. Since part 87 of the rail surface is most subject to erosion, the sintered layer can be confined mostly to it by plate 80 on the top and support 81 on the left. Slits 86 and 86A between rail 76, and support 81 and plate 80 respectively, allow easy passage of the rail. Shocks are produced successively by repeated spark discharges between electrodes 34 as the rail passes through. The explosive "tube" of FIGS. 4, 5 and 14 may also be used.

FIG. 10 is a vertical section along line 10—10 in FIG. 8 showing rail 76 within sinter chamber 73 which is partially closed by screening wall 85 except for a slit 86B between rail and wall, for reducing the leakage of sinter particles from the sintering chamber.

FIG. 11 is an enlargement of section 11 in FIG. 8, with a sinter particle collecting chamber 75A attached to bottom plate 77. This chamber collects the sinter particles which leak through slit 86B in FIG. 10. Bottom plate 77 has openings 90 through which the sinter particles fall, in the direction of arrows 91, into collecting chamber 75A, producing a sludge 92 which can be periodically collected and re-introduced into the sintering section 73 in FIG. 8.

FIG. 12 shows an application for producing a hard sintered layer on multiple parts which are introduced continuously, or in batches, depending on the entrance and exit means, and taken out through side walls 95A and 95 of chamber 93. These parts, shown here as pistons 97, are held by or mounted detachably to shaft 98 which moves through apertures in left and right cover means 96 and 96A; these may be quickly opened and closed to remove bodies from one side and replace them from the other side. Or, the cover means can be split so they can open before each shock wave to let bodies in and/or out. This type operation requires spacing of bodies at intervals along the shaft to accommodate the opening and closing of the cover means.

FIG. 13 shows a modification for bonding a sintered layer of selective hardness on the cutting edge of tools such as knives, scissors, choppers, grinders, etc. Rotary saw 102 having teeth 110 rotates on shaft 103 mounted on the walls of chamber 99, filled with liquid 37 in which sinter particles are dispersed.

FIG. 14 shows a modification for bonding a sintered layer along the inner wall of a machine part such as motor block 106 which is detachably mounted on bottom plate 105. Shocks are produced by igniting elongated explosive tubes 109 which extend through upper and lower walls 104 and 105 and through cylinders 107. Tube 109 may be patterned after that described in FIG. 5.

We claim:
1. In a coating or molding apparatus comprising a substantially closed liquid-filled container, the walls of which are penetrated by at least one set of electrodes for producing spark discharges in circuit with an electrical energy source and capacitor means for storing same, the container being rotatably mounted, and means for opening and closing the container to perform necessary chores before and after the sintering process, an improvement comprising:
　casting forms shaped according to the design of the body to be sintered thereupon, mounted by suitable attaching means inside the container and coated with protective covering means of hard durable material to limit damage, the covering means being easily broken away from the produced body;
　a channel means for filling said container at selective intervals, and other channel means for distributing within said liquid a quantity of sinter particles of hard powdered material sufficient to cover completely with a thick layer the casting forms; and rotation means in the form of shafts inserted in opposite sides of said container and extending radially therefrom, connections between the electrodes and the source of electrical energy arranged to reverse the poles of said electrodes upon rotation of the molds so that said rotary movement reverses the poles of said electrodes upon rotation of the molds so that said rotary movement reverses the poles of said electrodes twice in each revolution thereby lengthening electrode life and improving the spark discharges therebetween, and that distributes particles and helps form a sludge thereof next to the exposed surfaces of said casting forms, a large part of said sludge being impacted upon said forms into a compact sintered layer by each shock wave caused by said spark discharges, each successive layer further compacting the previous layers till a cohesive sintered body of designed hardness and thickness is produced, said sinter particles being replenished as they are used up.

2. A modification of the coating or molding apparatus described in claim 1 comprising:
　a liquid-filled cylindrical mold coated with a protective layer of durable material to limit damage and facilitate removal of the produced body;
　left and right end plates attached to opposite ends of said cylindrical mold, each adapted for quick removal and replacement, serving as opening and closing means;
　rotation means in the form of left and right shafts attached to said left and right end plates respectively, and rotatably supported;

at least one spaced set of electrodes penetrating each of said shafts inwardly, immersing the tips thereof in said liquid, each set capable of producing a spark discharge when in circuit with an electrical energy source and capacitor storing means;

a quantity of sinter particles of hard-to-work-with material dispersed in said water in such way as to form a sludge next to the exposed surface of said cylindrical mold upon which a layer of sintered particles will be impacted by the force of each shock wave produced by said electrical discharge as it drives the particles outward, successive waves compacting other layers that are impacted into the previous layers till a complete cohesive sintered body of designed thickness and hardness is produced, said sinter particles being replenished in the liquid as they are used up.

3. In a coating or molding apparatus comprising a substantially closed, liquid-filled container suitably mounted, at least one set of electrodes penetrating said container, the tips being immersed in said liquid and forming a spark gap capable of producing shock waves the other ends of the electrodes connected in circuit with an electrical energy source and capacitor means, and means for opening and closing the container to perform essential chores before and after each sintering operation, an improvement comprising:

casting forms shaped according to the body to be produced mounted inside said container and covered with a layer of hard protective material to limit damage and facilitate removal of the produced body;

channel means into the container for filling it and replenishing as required with a liquid capable of carrying sinter particles;

channel means for distributing throughout said liquid a quantity of sinter particles of hard material, enough to completely cover with a thick layer said casting forms; means to maintain said particles in suspension in said liquid and heating means surrounding said container to heat said casting forms, liquid and sinter particles to facilitate the sintering process;

mean to produce successive shock waves causing successive sintered layers to be compacted together, the first layer being impacted upon the casting form and other layers being impacted upon the previous ones till a cohesive sintered body is produced, the sinter particles in the liquid being replenished as they are used up.

4. A modification of the casting and molding apparatus described in claim 3 comprising a substantially closed liquid-filled pressure container, with bottom plate detachably fastened to the lower edges thereof and easily removable therefrom and replaced to serve as an opening and closing means for performing necessary chores; a mold disposed above said bottom plate and having indentations on the surface, a sheet of material to be coated with a sintered layer while being shaped by the mold being disposed over the mold in a liquid-tight manner; plural shock-producing means comprising spaced sets of electrodes penetrating the upper walls of said container into said liquid, and in circuit with an electrical energy source and a bank of capacitors for storing same; a quantity of sinter particles of hard material dispersed in said liquid in quantities sufficient to form a sludge next to said sheet of material, a large number of said particles being impacted into the surface of the sheet by the first shock wave produced by the energizing of the electrodes to form a thin sintered layer, successive later shock waves compacting other sinter layers one over the other till a complete molded sintered body is produced, both the sheet and the sintered layer thereon being hardened by the hammering action of successive shock waves and driven sinter particles, said particles being replenished in the liquid as they are used up.

5. A modification of the coating or molding apparatus described in claim 3, wherein the mold is:

an elongated substantially closed liquid-filled mold container means with a sintering chamber midway, having ends curved upward to limit spillage;

means mounted below said container consisting of collecting chambers into which excess liquid and particles dispersed therein will flow in order to use the particles again;

mounted within said container means opening and closing means at the ends of said sintering chamber, each pierced by an aperture designed to fit closely around the rod or rail that is to be worked on, to limit spillage and loss of shock wave effect;

two heavy metal plates running the full length of said sintering chamber and securely mounted upon the inner walls thereof and extending therefrom to the surface of the article to be worked on, one plate on each side of the strip that is to be hardened and receive a sintered layer, to concentrate the force of the shock waves and to confine sintered particles to the strip that is to be sintered;

a plurality of spaced sets of electrodes penetrating the top of said sintering chamber throughout the length thereof and in circuit with an electrical energy source and capacitor means for storing same, said energy flowing between the tips of each set of electrodes to produce a spark discharge that forms a shock wave in said liquid, each such shock wave impacting a large number of said sinter particles into the surface of the strip of the article to be sintered and forming a sintered layer thereon, successive shock waves impacting still other sinter particles in sinter layers upon the previous sinter layers until a cohesive sintered layer covers the full length of the exposed strip, both the strip and the sintered layer being hardened more by each additional shock wave due to the hammering action, said sinter particles being replenished in the liquid as they are used up; and traction means to pull said elongated bodies through the sintered chamber, and roller means to carry their weight.

6. In a method of casting sintered bodies with and without center cavities wherein sinter particles of hard-to-work-with material are compacted into a cohesive body by a spark discharge, the improvement that comprises the steps of:

filling a substantially closed pressure container means inclosing a shaped mold with a liquid in which is dispersed a quantity of sinter particles sufficient to cover said mold with a layer of sludge, and passing successive electrical discharges across the spark gap between the tips of a set of electrodes immersed in said liquid to produce successive shock waves the first of which impacts those sinter particles nearest the mold into a sintered layer thereon, each later shock wave impacting other particles into layers which are impacted on the previous layers and further compacting them till a cohesive sintered body of required thickness and hardness is produced, the sinter particles being replenished in the liquid as they are used up.

7. The improvement defined in claim 6 wherein shafts are attached to opposite sides of said container means so it can be rotated to help distribute said sinter particles more evenly through said liquid and cause most of them to form a sludge next to said mold, thus increasing the efficiency of the shock wave and facilitating the sintering process.

8. A method of hardening bodies and simultaneously coating them with a sintered layer of particles of hard material comprising the steps of:

mounting each body so that all parts are supported within a substantially closed container means filled with a liquid in which is dispersed a quantity of said particles sufficient to cover completely the exposed surfaces of all bodies, and successively energizing a shock producing means consisting of at least one spaced set of electrodes the tips of which are immersed in said liquid, producing successive shock waves through the liquid that radiate outward impacting those particles nearest the surface of said bodies into thin layers thereon, each later shock wave impacting another sintered layer upon the previous layers till a cohesive sintered layer of required thickness is formed on each body, the particles being replenished in the liquid as they are used up, each body meanwhile being hardened by the hammering action of the shock waves and particles.

9. In a method of simultaneously hardening the surface of a body, shaping it to the conformity of a mold, and coating it with a sintered layer of hard material, by using electric spark discharges, the improvement that comprises the steps of:

mounting said body over a mold disposed within a substantially closed pressure container means filled with liquid in which are dispersed enough sinter particles of hard-to-work-with material to completely cover all exposed surfaces of said body;

successively energize a spark producing means consisting of at least one set of electrodes whose tips are immersed in said liquid to produce successive shock waves that radiate outward, the first wave impacting a large number of particles into a thin sintered layer on said body and forcing it toward said mold, each succeeding shock wave compacting other sinter particles into a layer which is bonded with the previous layer and forcing more of the body toward the mold, the process continuing till a cohesive sintered layer is formed on the body and the body in turn has assumed the conformation of the mold, both the body and the layer being further hardened by the hammering action of the shock waves and the particles, said particles being replenished in the liquid as they are used up.

References Cited

UNITED STATES PATENTS

| | | |
|---|---|---|
| 2,555,227 | 7/1957 | Rieber. |
| 3,163,141 | 12/1964 | Wesley et al. |
| 3,181,327 | 5/1965 | Barnett et al. |
| 3,222,902 | 12/1965 | Brejcha et al. |
| 3,225,578 | 12/1965 | Krieger. |
| 3,228,221 | 1/1966 | Zernow et al. |
| 3,232,085 | 2/1966 | Inoue. |
| 3,232,086 | 2/1966 | Inoue. |
| 3,248,917 | 3/1966 | Herring. |
| 3,267,710 | 8/1966 | Inoue. |
| 3,149,372 | 9/1964 | Stinger. |
| 3,160,952 | 12/1964 | Corney _____ 264—84 X |
| 3,220,103 | 11/1965 | Simons _____ 264—84 X |

WILLIAM J. STEPHENSON, *Primary Examiner.*